United States Patent
Burd et al.

(10) Patent No.: US 7,274,524 B1
(45) Date of Patent: Sep. 25, 2007

(54) CORRECTING ERRORS IN DISK DRIVE READ BACK SIGNALS BY ITERATING WITH THE REED-SOLOMON DECODER

(75) Inventors: Gregory Burd, San Jose, CA (US); Zining Wu, Los Altos, CA (US); Mats Oberg, Cupertino, CA (US); Pantas Sutardja, San Jose, CA (US)

(73) Assignee: Marvell International Ltd., Hamilton (BM)

( * ) Notice: Subject to any disclaimer, the term of this patent is extended or adjusted under 35 U.S.C. 154(b) by 0 days.

(21) Appl. No.: 11/090,209

(22) Filed: Mar. 28, 2005

Related U.S. Application Data

(63) Continuation of application No. 10/135,422, filed on Apr. 29, 2002, now Pat. No. 6,961,197.

(60) Provisional application No. 60/352,756, filed on Jan. 28, 2002, provisional application No. 60/344,407, filed on Dec. 28, 2001.

(51) Int. Cl.
*G11B 5/09* (2006.01)
(52) U.S. Cl. ....................................... 360/53
(58) Field of Classification Search .............. None
See application file for complete search history.

(56) References Cited

U.S. PATENT DOCUMENTS

| | | | |
|---|---|---|---|
| 4,821,268 A | 4/1989 | Berlekamp | |
| 5,241,546 A | 8/1993 | Peterson et al. | |
| 5,341,387 A * | 8/1994 | Nguyen | 714/795 |
| 5,434,719 A | 7/1995 | Miller et al. | |
| 5,446,743 A | 8/1995 | Zook | |
| 5,539,774 A | 7/1996 | Nobakht et al. | |
| 5,677,802 A | 10/1997 | Saiki et al. | |
| 5,689,532 A | 11/1997 | Fitzpatrick | |
| 5,844,920 A | 12/1998 | Zook et al. | |
| 5,974,583 A | 10/1999 | Joo | |
| 6,154,868 A | 11/2000 | Cox et al. | |
| 6,192,492 B1 | 2/2001 | Masiewicz et al. | |
| 6,233,709 B1 | 5/2001 | Zhang et al. | |
| 6,343,367 B1 | 1/2002 | Shen et al. | |
| 6,513,141 B1 | 1/2003 | Livingston | |
| 6,668,349 B1 | 12/2003 | Sawaguchi | |
| 6,694,477 B1 | 2/2004 | Lee | |
| 6,732,328 B1 | 5/2004 | McEwen et al. | |
| 6,747,829 B2 * | 6/2004 | Stanek et al. | 360/53 |
| 6,754,018 B2 | 6/2004 | Takahashi | |
| 6,961,197 B1 * | 11/2005 | Burd et al. | 360/53 |
| 7,050,517 B1 * | 5/2006 | Sallaway et al. | 375/350 |

\* cited by examiner

*Primary Examiner*—Andrea Wellington
*Assistant Examiner*—Dan I Davidson

(57) ABSTRACT

A signal detector to detect symbols in a read back signal. The signal detector includes a first detector to generate raw decisions as a function of the read back signal. A post processor identifies possible defects in the raw decisions. A selector selects a portion of the possible defects and generates modified decisions based upon correcting the portion of the possible defects. At least one signal decoder generates final decisions as a function of the modified and raw decisions. A decision block returns control to the selector in response to detecting excess errors in the final decisions.

6 Claims, 4 Drawing Sheets

CORRECTING ERRORS IN DISK DRIVE READ BACK SIGNALS BY ITERATING WITH THE REED-SOLOMON DECODER

CROSS-REFERENCE TO RELATED APPLICATIONS

This application is a continuation application that claims the benefit under 35 U.S.C. §120 of U.S. patent application Ser. No. 10/135,422, entitled "CORRECTING ERRORS IN DISK DRIVE READ BACK SIGNALS BY ITERATING WITH THE REED-SOLOMON DECODER", filed on Apr. 29, 2002 now U.S. Pat. No. 6,961,197, the entire content of which is expressly incorporated herein by reference. This application also claims the benefit of the filing date of U.S. provisional applications No. 60/344,407 filed Dec. 28, 2001, and No. 60/352,756 filed Jan. 28, 2002, the content of each of which is herein incorporated by reference in its entirety.

TECHNICAL FIELD

This invention relates to a detection scheme for input signals of communication system channels.

BACKGROUND

Data stored on magnetic media, such as hard disk drives, is typically encoded using error correction code so that errors that occur in storage and read back of the data might be detected and corrected. In conventional systems, the read back signal is typically detected by a Viterbi detector that makes bit-by-bit (hard) decisions of the read back signal. The decisions from the Viterbi usually include errors. A post-processor may be used in an attempt to correct the errors before sending them to the error correction code decoder.

However, during post-processing of the Viterbi decisions, the post-processor sometimes makes mis-corrections leading to potentially more errors in the post-processed signal than in the Viterbi detected signal. A decoder applies an error correction routine to the processed signal to retrieve codewords in the signal. If the processed signal contains too many errors, the decoder will decode the sequence to an incorrect codeword, which may result in a retry being initiated. During a retry, the entire process repeats beginning with the Viterbi detector in an attempt to reduce the number of errors generated in the bit decisions so that after post-processing the errors are low enough for the decoder to generate accurate codewords. Each retry is computationally complex and may consume a significant amount of computation time. In addition, during each retry a different set of errors may occur in the Viterbi decisions and post-processed signal resulting in further retries.

SUMMARY

A signal detector to detect symbols in a read back signal. The signal detector includes a first detector to generate raw decisions as a function of the read back signal. A post processor identifies possible defects in the raw decisions. A selector selects a portion of the possible defects and generates modified decisions based upon correcting the portion of the possible defects. At least one signal decoder generates final decisions as a function of the modified and raw decisions. A decision block returns control to the selector in response to detecting excess errors in the final decisions.

The details of one or more embodiments of the invention are set forth in the accompanying drawings and the description below. Other features, objects, and advantages of the invention will be apparent from the description and drawings, and from the claims.

DESCRIPTION OF DRAWINGS

Like reference symbols in the various drawings indicate like elements.

DETAILED DESCRIPTION

Figure 1A:
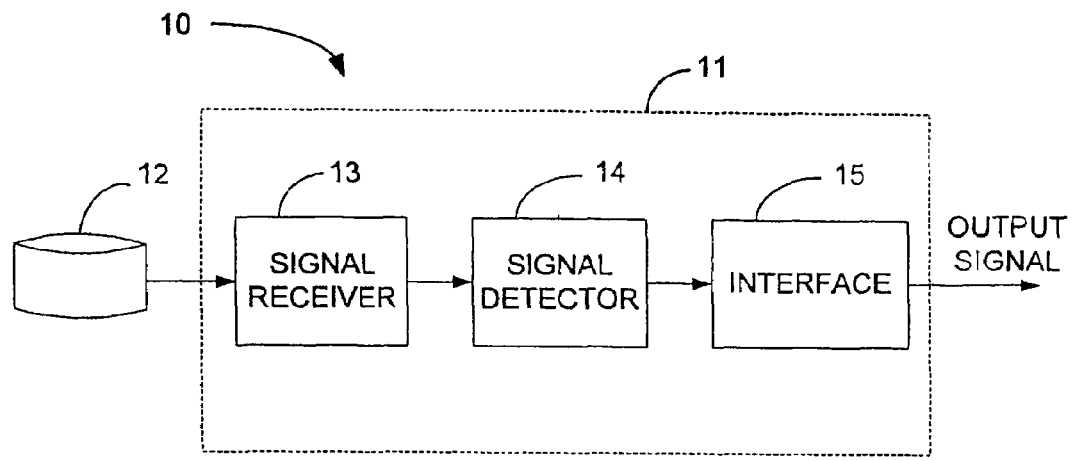
FIG. 1A is a block diagram of one aspect of an error correction system for read signals from a disk drive.

FIG. 1A shows a disk drive system 10 including a read channel device 11 for detecting a read back signal from a hard disk drive 12. Although, the invention may preferably be employed as part of a disk drive system, any communication system is suitable and in particular communication systems having a noisy communication channel. The read channel device 11 may include a signal receiver 13 to receive and condition the read back signal. A signal detector 14 detects and decodes the conditioned read back signal to generate a codeword. The signal detector 14 may attempt to decode a detected symbol multiple times to obtain a correct codeword. An interface circuit 15 coupled to the signal detector 21 outputs the codeword.

Figure 1B:
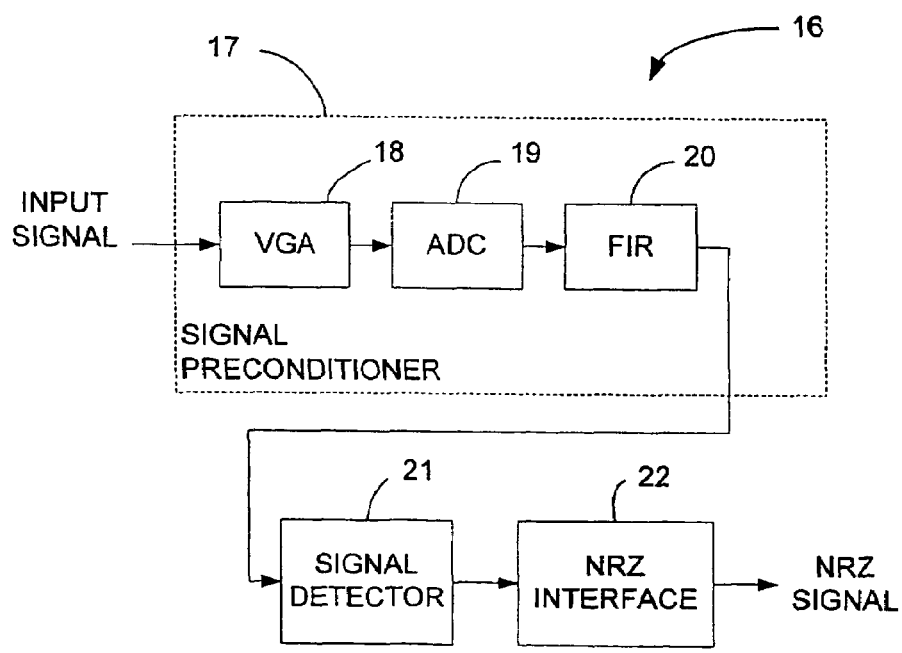
FIG. 1B is a block diagram of one aspect of an error correction system for noisy input signals.

FIG. 1B shows a read channel device 16 for detecting an input signal. The read channel device 16 may include a signal preconditioner 17 to receive the input signal. A signal detector 21 detects and decodes the conditioned input signal to generate a codeword. The signal detector 21 may attempt to decode a detected symbol multiple times to obtain a correct codeword. An interface circuit 22 coupled to the signal detector 21 outputs the codeword. Any form of preconditioner 17 may be employed. One example includes a variable gain amplifier (VGA) 18 coupled to an analog-to-digital converter (ADC) 19 and finite-impulse-response filter (FIR) 20.

Figure 2:
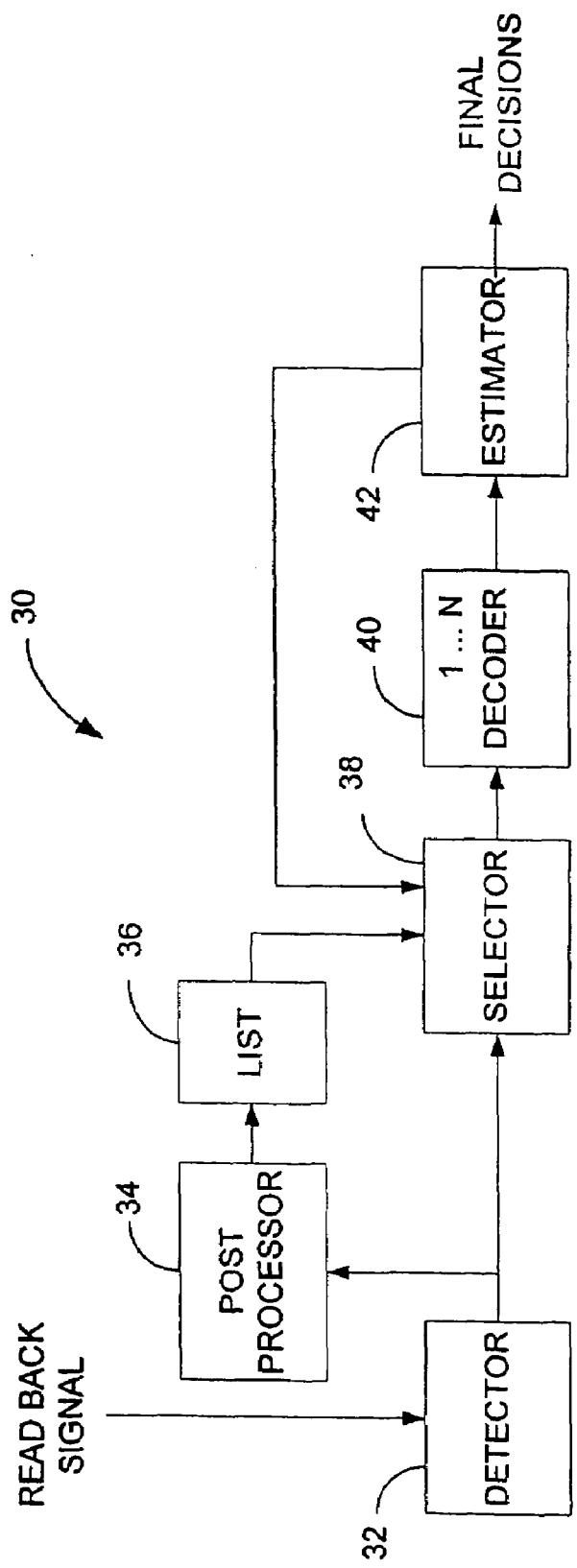
FIG. 2 is a block diagram of another aspect of an error correction system for read back signals.

FIG. 2 shows a signal detector 30 in accordance with the principles of the invention. The signal detector 30 detects and decodes a read back signal from a hard disk drive (not shown). The signal detector 30 includes a detector 32 to generate raw decisions based on the read back signal. The detector 32 may be any Viterbi-like detector including selectable noise-predictive detectors. A post-processor 34 evaluates the raw decisions to determine whether any possible errors are included within the decisions. The post-processor 34 generates a list 36 of the possible defects. The possible defects may be grouped in any manner in the list 36 such as being categorized as either possible errors or possible erasures, or being listed by likelihood of being an error or erasure. A selector 38 selects one or more of the possible defects from the list 36 and applies a correction technique or marks an erasure to generate modified decisions. A decoder 40 decodes the modified decisions to generate final decisions. The decoder 40 is preferably a single Reed-Solomon decoder, however other decoders such as Bose, Chaudhuri, Hocquerghen (BCH) Code, Hamming Code, and Trellis Code decoders may be used. Also, more than one decoder may operate on modified decisions. For example, the selector 38 may select several groupings of errors/erasures and generate modified decisions corresponding to each grouping. Each of the modified decisions may then be sent to separate decoders for decoding. The final decisions from the decoder 40 are evaluated by an estimator 42 to determine whether the sequence in the read back signal has been decoded to the correct codeword.

Figure 3:
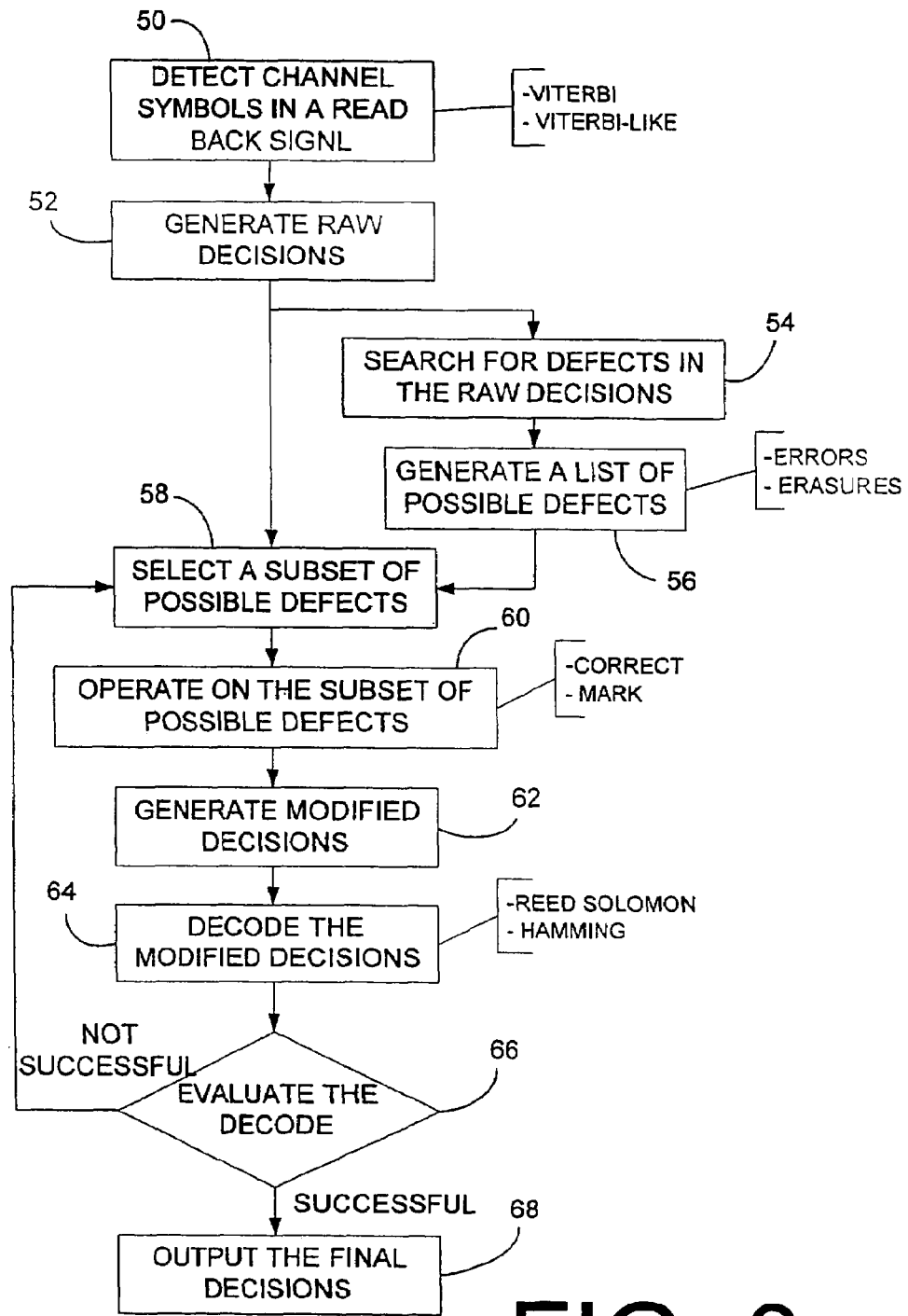
FIG. 3 is a flow diagram of one aspect of an error correction system for read back signals.

FIG. 3 shows a detection scheme for a hard disk drive read back signal. At block 50, channel symbols in a read back signal are detected. Preferably, maximum likelihood decisions are made based on the read back signals to generate raw decisions, block 52. Continuing to block 54, the raw decisions are evaluated for possible defects such as possible errors and possible erasures. At block 56, a list of the possible defects is generated. The list may group the defects in any manner such as by possible errors, possible erasures, and by the likelihood of the possible defect being an actual defect. The length of the list may be fixed or variable including limiting the length to a predetermined quantity of possible defects and including all possible defects that exceed a likelihood threshold. Continuing to block 58, a subset of the possible defects associated with the raw decisions is selected. The subset of possible defects may include possible errors, possible erasures, or a combination of possible errors and erasures. At block 60, the subset of possible defects and corresponding raw decisions are operated on to attempt to correct the possible errors and mark the possible erasures. Continuing to block 62, modified decisions are generated as a function of operating on the subset of possible defects and corresponding raw decisions. At block 64, the modified decisions are decoded to generate final decisions. At decision block 66, the final decisions are evaluated to determine whether the sequence was decoded to a correct codeword. If the decode is successful and the correct codeword is decoded, the final decisions are output. But, if a wrong codeword is decoded, control is transferred to block 58, and another subset of possible defects is selected. The detection scheme may continue to loop through blocks 58 to 66 until a correct codeword is decoded, the loop is executed a predetermined number of times, or until a specified threshold is reached such as computation time. Computation speed is enhanced by not looping back to the detector to eliminate errors by redetecting the sequence within the read back signal. Instead, the detection scheme operates on the originally detected sequence and uses the selector and decoder to correct or mark subsets of the defects to obtain a correct codeword.

As an example of one implementation, the 12 most-likely defects in the raw decisions may be listed and the selector may correct/mark up to 3 defects at a time from the list of 12 defects. In this case, the decoder may need to perform up to 299 decoding attempts, with an average number of decoding attempts of about 150.

Figure 4:
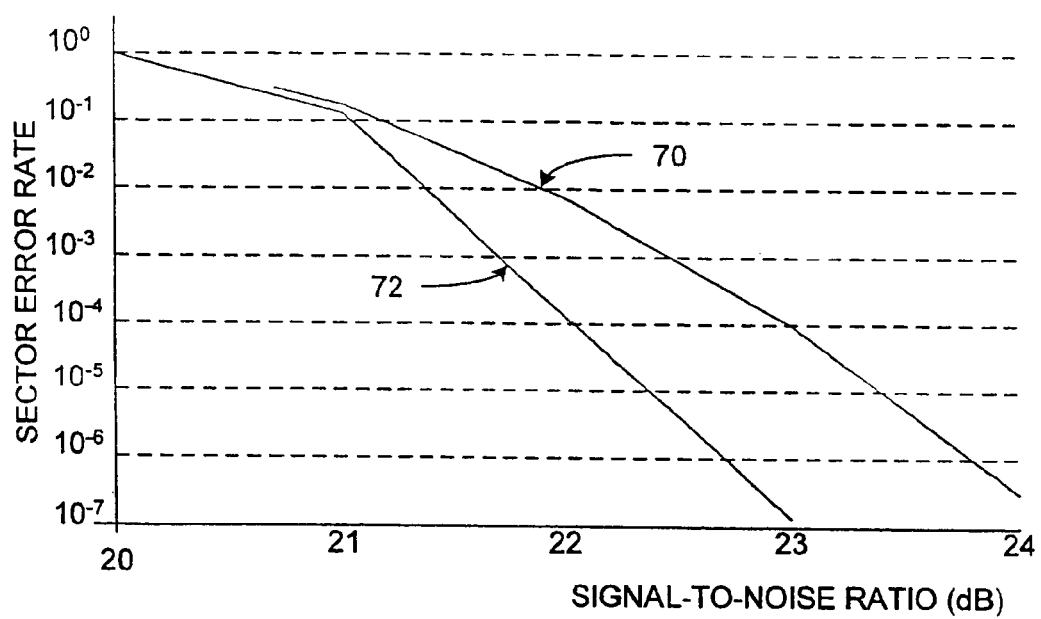
FIG. 4 is a data graph illustrating the performance improvement of one aspect of an error correction system for read back signals.

FIG. 4 shows a comparison simulation of the sector error rate for a conventional detector 70 versus a detector 72 in accordance with the principles of the invention. For the simulation, it is assumed the decoder employs a Reed-Solomon Code with 10-bit symbols and can correct 3 symbol errors. The simulation is performed with a user bit density (UBD) of 2.747 and 100% additive white Gaussian noise.

A number of embodiments of the invention have been described. The invention may be implemented in any known means including hardware, software, firmware, middleware and combinations thereof. It will be understood that various modifications may be made without departing from the spirit and scope of the invention. Accordingly, other embodiments are within the scope of the following claims.

What is claimed is:

1. A signal detector to detect symbols in a read back signal, comprising:
   a first detector to generate raw decisions as a function of the read back signal;
   a post processor to identify a list of N possible defects in the raw decisions;
   a selector that selects at least one of said N possible defects, that at least one of applies a correction technique and marks an erasure, and that generates a modified decision based on said selected one of said N possible defects, where N is an integer greater than one; and
   a decoder that decodes the modified decision to generate a final decision, that evaluates the final decision to determine whether a correct codeword is generated, that outputs the final decision if the correct codeword is generated, and that causes the selector to select another one of said N possible defects when the correct codeword is not generated, wherein said decoder performs at least one of Reed-Solomon decoding, Bose Chaudhuri Hocquerghen (BCH) decoding, Hamming decoding, and Trellis decoding.

2. A signal detector to detect symbols in a read back signal, comprising:
   means for detecting to generate raw decisions as a function of the read back signal;
   means for post-processing to identify a list of N possible defects in the raw decisions;
   selecting means for selecting at least one of said N possible defects, for at least one of applying a correction technique and marking an erasure, and for generating a modified decision based on said N possible defects, where N is an integer greater than one; and
   means for decoding the modified decision to generate a final decision, for evaluating the final decision to determine whether a correct codeword is generated, for outputting the final decision if the correct codeword is generated, and for causing the selecting means to select another one of said N possible defects when the correct codeword is not generated,
   wherein said decoding means performs at least one of Reed-Solomon decoding, Bose Chaudhuri Hocquerghen (BCH) decoding, Hamming decoding, and Trellis decoding.

3. A detecting method for read back signals, comprising:
   detecting symbols in the read back signal;
   generating raw decisions as a function of the detected symbols;
   post-processing the raw decisions to identify a list of N possible defects;
   selecting at least one of said N possible defects where N is an integer greater than one;
   at least one of applying a correction technique and marking an erasure;
   generating a modified decision based on said N possible defects;
   decoding the modified decisions to generate a final decision;
   evaluating the final decision to determine whether a correct codeword is generated;

outputting the final decision if the correct codeword is generated; and selecting another one of said N possible defects when the correct codeword is not generated, wherein said decoding includes performing at least one of Reed-Solomon decoding, Bose Chaudhuri Hocquerghen (BCH) decoding, Hamming decoding, and Trellis decoding.

4. A computer program stored on a tangible computer medium to configure a general purpose computer to perform a detecting method for communication signals comprising:

detecting symbols in the read back signal;

generating raw decisions as a function of the detected symbols;

post-processing the raw decisions to identify possible defects;

selecting at least one of said N possible defects where N is an integer greater than one;

at least one of applying a correction technique and marking an erasure;

generating a modified decision based on said at least one of said N possible defects;

decoding the modified decisions to generate a final decision;

evaluating the final decision to determine whether a correct codeword is generated;

outputting the final decision if the correct codeword is generated; and selecting another one of said N possible defects when the correct codeword is not generated, wherein said decoding includes performing at least one of Reed-Solomon decoding, Bose Chaudhuri Hocquerghen (BCH) decoding, Hamming decoding, and Trellis decoding.

5. A disk drive, comprising:

means for storing information;

means for reading the information and for generating a read back signal;

means for detecting to generate raw decisions as a function of the read back signal;

means for post-processing to identify a list of N possible defects in the raw decisions;

selecting means for selecting at least one of said N possible defects, for at least one of applying a correction technique and marking an erasure, and for generating a modified decision based on said N possible defects, where N is an integer greater than one; and means for decoding the modified decision to generate a final decision, for evaluating the final decision to determine whether a correct codeword is generated, for outputting the final decision if the correct codeword is generated, and for causing the selecting means to select another one of said N possible defects when the correct codeword is not generated, wherein said decoding means performs at least one of Reed-Solomon decoding, Bose Chaudhuri Hocquerghen (BCH) decoding, Hamming decoding, and Trellis decoding.

6. A disk drive comprising:

a media to store information;

a receiver to read the information and generate a read back signal;

a first detector to generate raw decisions as a function of the read back signal;

a post processor to identify a list of N possible defects in the raw decisions;

a selector that selects at least one of said N possible defects, that at least one of applies a correction technique and marks an erasure, and that generates a modified decision based on said N possible defects, where N is an integer greater than one; and a decoder that decodes the modified decision to generates a final decision, that evaluates the final decision to determine whether a correct codeword is generated, that outputs the final decision if the correct codeword is generated, and that causes the selector to select another one of said N possible defects when the correct codeword is not generated, wherein said decoder performs at least one of Reed-Solomon decoding, Bose Chaudhuri Hocquerghen (BCH) decoding, Hamming decoding, and Trellis decoding.

* * * * *